(12) United States Patent
Thuerk et al.

(10) Patent No.: US 9,099,730 B2
(45) Date of Patent: Aug. 4, 2015

(54) STORAGE BATTERY HAVING MOLDED-IN TERMINAL

(75) Inventors: David Thuerk, Brookfield, WI (US); Guy Pfeifer, Milwaukee, WI (US); Mark Inkmann, Wauwatosa, WI (US); Matthew Bielawski, Bloomington, IN (US)

(73) Assignee: C&D Technologies, Inc., Blue Bell, PA (US)

( * ) Notice: Subject to any disclaimer, the term of this patent is extended or adjusted under 35 U.S.C. 154(b) by 444 days.

(21) Appl. No.: 12/691,074

(22) Filed: Jan. 21, 2010

(65) Prior Publication Data

US 2011/0177384 A1     Jul. 21, 2011

(51) Int. Cl.
*H01M 2/06* (2006.01)
*H01M 2/30* (2006.01)
*H01M 2/04* (2006.01)

(52) U.S. Cl.
CPC .............. *H01M 2/305* (2013.01); *H01M 2/043* (2013.01); *H01M 2/307* (2013.01)

(58) Field of Classification Search
CPC ......... H01M 2/266; H01M 2/30; H01M 2/04; H01M 2/06; H01M 2/0242; H01M 2/307
USPC .......................................... 429/161, 175–179
See application file for complete search history.

(56) References Cited

U.S. PATENT DOCUMENTS

| | | | |
|---|---|---|---|
| 3,711,335 A | 1/1973 | Daniel | |
| 3,980,126 A * | 9/1976 | Eberle | 164/271 |
| 4,337,301 A | 6/1982 | Rorer et al. | |
| 4,351,890 A | 9/1982 | Oxenreider | |
| 4,424,854 A | 1/1984 | Tiegel | |
| 4,444,853 A | 4/1984 | Halsall et al. | |
| 4,448,863 A | 5/1984 | Terrell | |
| 4,898,796 A * | 2/1990 | Furukawa et al. | 429/178 |
| 5,281,493 A * | 1/1994 | Jones | 429/179 |
| 5,441,123 A * | 8/1995 | Beckley | 180/68.5 |
| 5,552,642 A | 9/1996 | Dougherty et al. | |

(Continued)

FOREIGN PATENT DOCUMENTS

JP     H09213302 A     8/1997

OTHER PUBLICATIONS

International Search Report, International Application No. PCT/US2011/021859.

*Primary Examiner* — Ula C Ruddock
*Assistant Examiner* — Thomas Parsons
(74) *Attorney, Agent, or Firm* — Hoffmann & Baron, LLP

(57) ABSTRACT

A storage battery includes a generally rectangular container having opposed side walls, end walls, a bottom wall and an open top defining a container interior. The container interior is divided into a plurality of cells supporting positive and negative plates. The plates include aligned positive lugs and aligned negative lugs. A pair of conductive straps are provided. One of the straps interconnects the positive lugs while the other strap interconnects the negative lugs. A tombstone extends from each of the straps. Each tombstone is located at a position spaced inwardly from the container walls. A pair of battery terminals are supported within the container end walls. Each battery terminal is directly connected to one of the tombstones. The battery terminals are positioned between the tombstone and the container wall and include a termination location adjacent the container wall for direct disconnectable termination thereat. A cover is provided for enclosing the open end of the container.

11 Claims, 6 Drawing Sheets

(56) References Cited

U.S. PATENT DOCUMENTS

| | | | |
|---|---|---|---|
| 5,905,002 A * | 5/1999 | Lund et al. | 429/180 |
| 6,190,796 B1 | 2/2001 | Chalasani et al. | |
| 6,258,481 B1 * | 7/2001 | Ross et al. | 429/180 |
| 6,312,852 B1 | 11/2001 | Wagner | |
| 6,395,421 B1 * | 5/2002 | Partington et al. | 429/185 |
| 6,693,408 B2 * | 2/2004 | Rodriguez et al. | 320/112 |
| 6,737,192 B2 | 5/2004 | Yabuki et al. | |
| 6,794,081 B2 | 9/2004 | Heimer | |
| 2009/0042098 A1 | 2/2009 | Nakayama et al. | |
| 2009/0297943 A1 | 12/2009 | Bielawski et al. | |

* cited by examiner

STORAGE BATTERY HAVING MOLDED-IN TERMINAL

FIELD OF THE INVENTION

The present invention relates generally to a storage battery, and more particularly, relates to a storage battery having a terminal molded within the battery structure.

BACKGROUND OF THE INVENTION

Storage batteries which are used for automotive and industrial applications have battery terminals which are provided for exterior electrical connection purposes. The battery terminals are connected to positive and negative electrical plates contained within cells of the battery.

Battery terminals typically are provided in two constructions. One type includes battery posts which extend outwardly from the battery container. These terminal posts may extend either from the cover or from the side walls of the container. A further type of terminal is a molded-in terminal where the terminal is molded into the side wall or the cover of the storage battery. One example of such a side molded battery terminal is shown in U.S. Pat. No. 4,351,890.

In providing storage batteries for various uses such as, for example, industrial uses, the footprint in which the battery must be placed is of concern. In certain situations, multiple interconnected batteries are supplied in a rack or cabinet. The batteries are tightly packed in the rack. A replacement battery must be able to be supported in the cramped footprint and still leave room for interconnection. Quite often, in these tight environments, it is difficult to position a replacement battery within the original footprint and yet provide suitable space to access the battery terminals. This is especially the case with terminals such as post and molded-in terminals where the terminals extend outwardly from the battery container or cover. Space must be provided to accommodate the extending terminals, thus rendering it difficult to position the battery in a smaller footprint.

Another problem associated with battery construction is the connection of the positive and negative plates of the battery cells to the positive and negative battery terminals. Quite often, additional space must be provided to assure adequate connection between the plates and the battery terminals.

It is, therefore, desirable to provide a battery construction having a terminal which resides within the original footprint of the battery, and which provides adequate termination, thus making it easier to replace the battery.

SUMMARY OF THE INVENTION

The present invention provides a storage battery including a generally rectangular container having opposed side, end walls, a bottom wall, and an open top defining a container interior. The container interior is divided into a plurality of cells which support positive and negative plates. The plates include aligned positive lugs and aligned negative lugs. A pair of conductive straps are provided. One strap interconnects the positive lugs while another strap interconnects the negative lugs. A tombstone extends from each strap. Each tombstone is located at a position spaced inwardly from the container walls. A pair of battery terminals are supported within the cover, within the container footprint. Each battery terminal is directly connected to the tombstone. Each battery terminal is positioned in the cover between the tombstone and the plane of the container wall and includes a termination location at the container wall for direct disconnectable termination thereat. A cover is provided for enclosing the open end of the container.

DETAILED DESCRIPTION OF THE PREFERRED EMBODIMENTS

Figure 1:
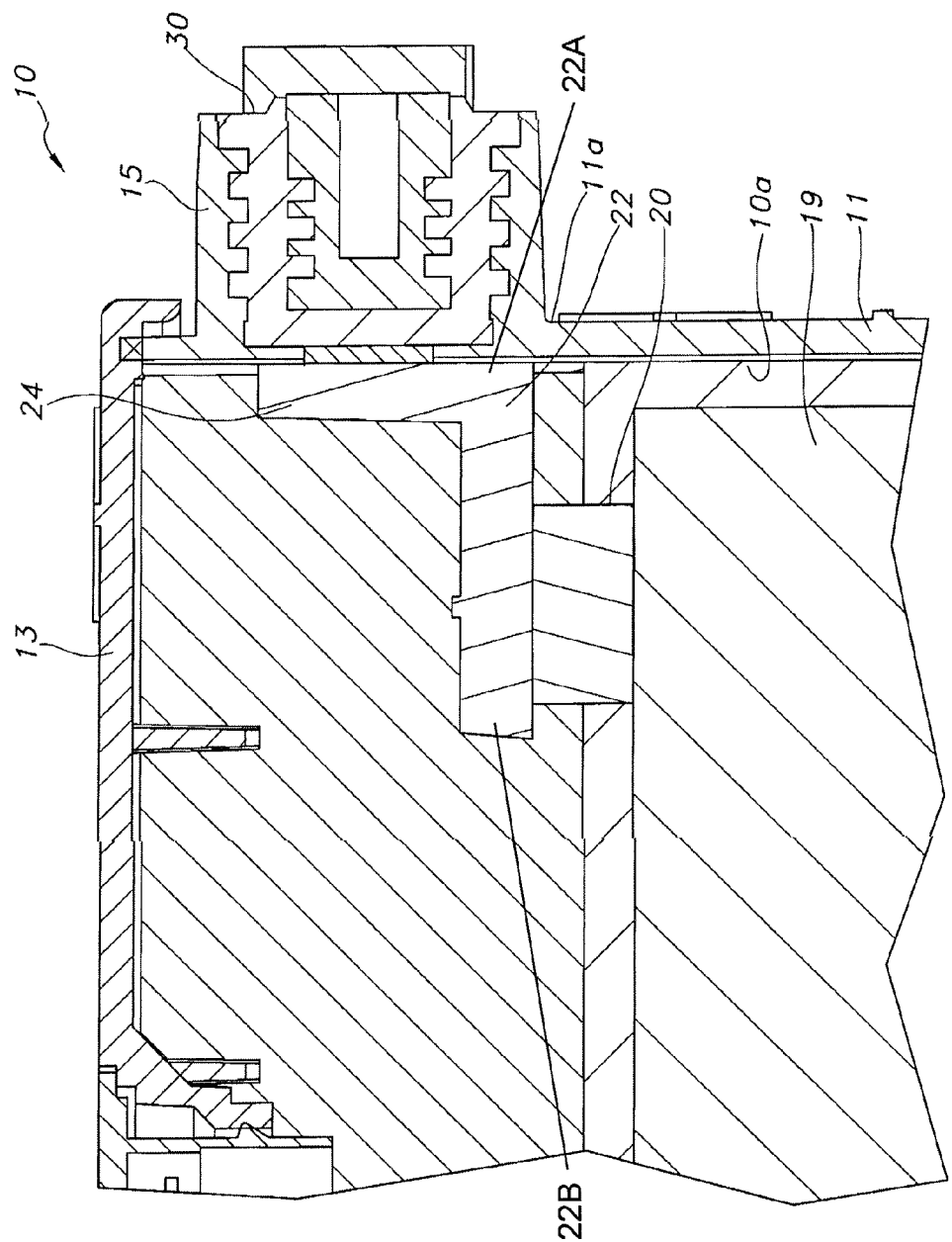
FIG. 1 is a sectional showing of a conventional battery of the prior art having a side terminal extending from the side wall of the battery container.

Referring to FIG. 1, a storage battery 10 of conventional construction is shown. Storage battery 10 includes a generally rectangular container 11 made of a suitable plastic material. Container 11 includes side walls and end walls (a back wall not shown and a front wall 11a) as well as a bottom wall and an open top. The side and end walls of the container define a container footprint. The interior of the container 10a is divided into a series of cells by partition walls. The open top of the container is sealably closed by a cover 13. Each cell includes a plurality of positive and negative plates 19 which alternate in the cells. The positive and negative plates are of conventional construction and include a lug 20 extending upwardly therefrom. The positive lugs of the plates are longitudinally aligned as are the negative lugs of the plate.

The positive lugs and the negative lugs are interconnected by a conductive strap. The strap is welded or otherwise secured to the lugs establishing electrical interconnection respectively between the positive and negative lugs. The pair of conductive straps 22 each have an outboard edge 22a facing toward the front wall 11a and an inboard edge 22b facing away from the front wall 11a. Extending upwardly from the outboard edge 22a of each strap is an upstanding tombstone.

Adjacent one end of the battery, certain of the lugs 20 are positioned for electrical connection to a battery terminal 30. At that location, a terminal strap 22 having a terminal tombstone 24 is employed. The terminal tombstone 24 and the terminal strap 22 form a generally reverse L-shape configuration where the tombstone 24 extends along the front wall 11a of the container. Each terminal tombstone 24 is connected to a battery terminal 30. A conventional storage battery includes two battery terminals, one connected to the positive lugs of the cells, and the other connected to the negative lugs of the cells.

In the construction shown in FIG. 1, each battery terminal 30 is a molded-in terminal which is molded with the front wall 11a of the container. The terminal 30 is supported within an integrally formed molded annular collar 15 which extends outwardly from front wall 11a. The terminal 30 is electrically secured to the terminal tombstone 24 establishing an electrical connection between the cells and the terminal.

As may be appreciated, the battery construction shown in FIG. 1 provides a molded-in terminal which extends substantially outwardly from the front wall 11a of the container and thus outside the footprint of the battery. Thus, in replacing a battery, a significant area beyond the footprint of the original battery must be provided to accommodate the extending terminals and the interconnections that must be made to the terminals. The present invention provides a molded-in battery terminal which resides within the original footprint of the battery so that battery and the terminations need not occupy additional space.

Efforts to address the footprint problem described above are shown in FIG. 2 where battery terminals 30' are supported within a cover 13'. In order to assure adequate electrical connection between the plates of the battery and the terminals 30', an L-shaped conductive member 22' is employed. The L-shaped conductive member 22' includes a conductive strap 23' having an outboard edge 23a', facing toward the front wall and an inboard edge 23b', facing away from the front wall; a conductive member 22' extending from a proximal end 22a', to a distal end 22b'; and an upstanding post 24'. The conductive member proximal end 22a' is attached to the conductive strap inboard edge 23b', and extends in a direction away from the front wall. The post 24' has a lower proximal end 24b' attached to the conductive member distal end 22b'. The post 24' has an upper distal end 24a' which extends upwardly and is accessible through the cover 13'.

Figure 2:
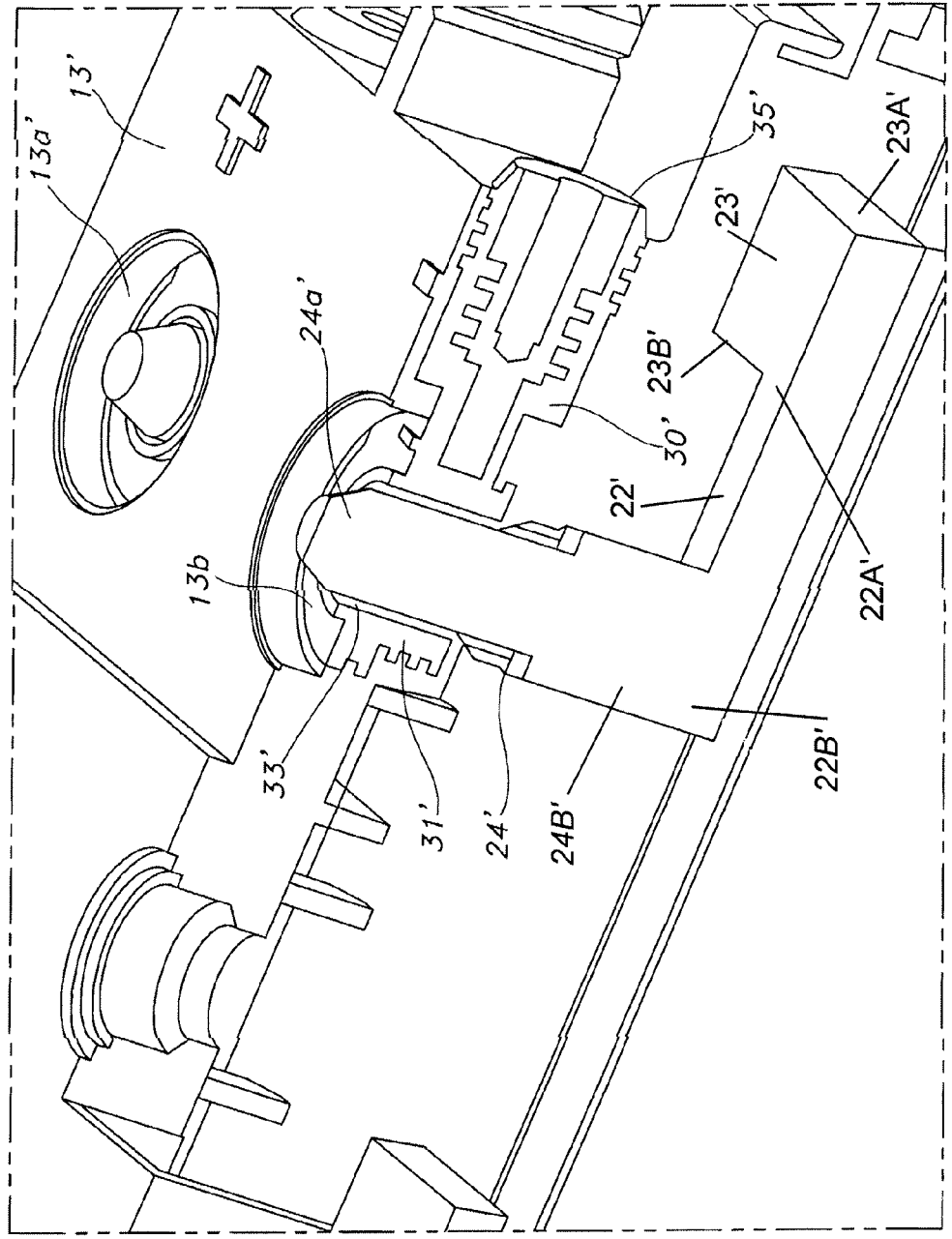
FIG. 2 is a perspective showing of a portion of a conventional battery having cover mounted terminals.

While attempting to address the problem of maintaining the replacement battery in the existing footprint, it has been found that the termination construction shown in FIG. 2 may result in less than desirable electrical connection between the plates and the battery terminals, inasmuch as the terminal is connected through a termination end extending significantly rearward from the access portion of the battery terminal. This provides an increased current path between the conductive member 22' and the connection end 35' of the battery terminals 30'.

The present invention addresses these problems by providing a battery construction having battery terminals which are located within the original footprint of the battery and which provide a shorter current path between the positive and negative plates and the positive and negative terminals.

Figure 3:
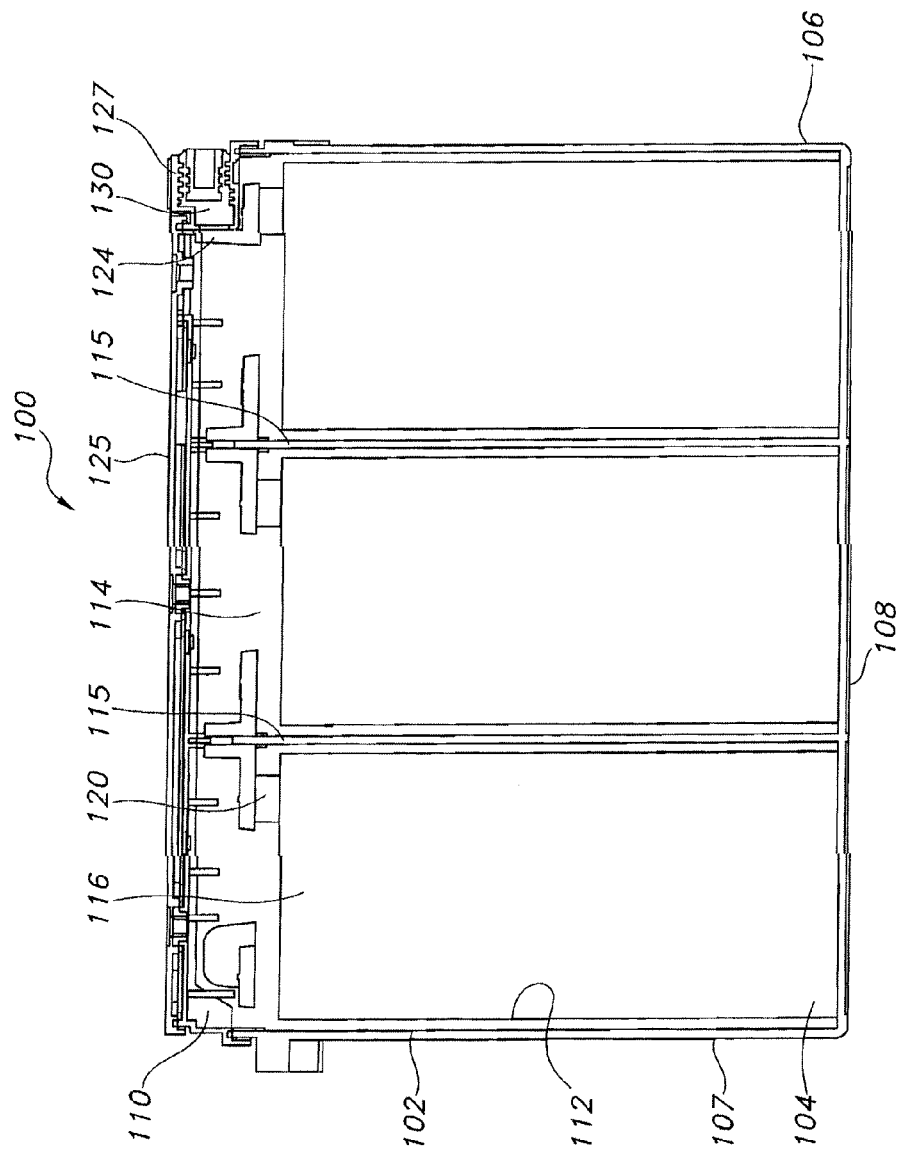
FIG. 3 is a sectional showing of a battery including a terminal constructed in accordance with the present invention.

Referring now to FIG. 3, the storage battery of the present invention is shown. The storage battery 100 includes a generally rectangular container 102 made of a suitable plastic material. Container 102 includes opposed side walls 104 and end walls (front wall 106 and back wall 107) as well as a bottom wall 108 and an open upper end 110. The end walls and side walls define the container footprint. The interior 112 of container 102 includes a plurality of cells 114 divided by partition walls 115. Each of the cells 114 supports a plurality or stack of positive and negative plates 116 which are of conventional construction. Each of the plates 116 includes an upwardly extending lug 120 where the lugs of the positive plates are aligned as are the lugs of the negative plates. The open upper end 110 is enclosed by a cover structure including a primary cover 127 and a secondary cover 125. The primary cover 127 supports positive and negative battery terminals 130 as will be described hereinbelow. The secondary cover 125 and the primary cover 127 enclose and seal the battery container.

Figure 4:
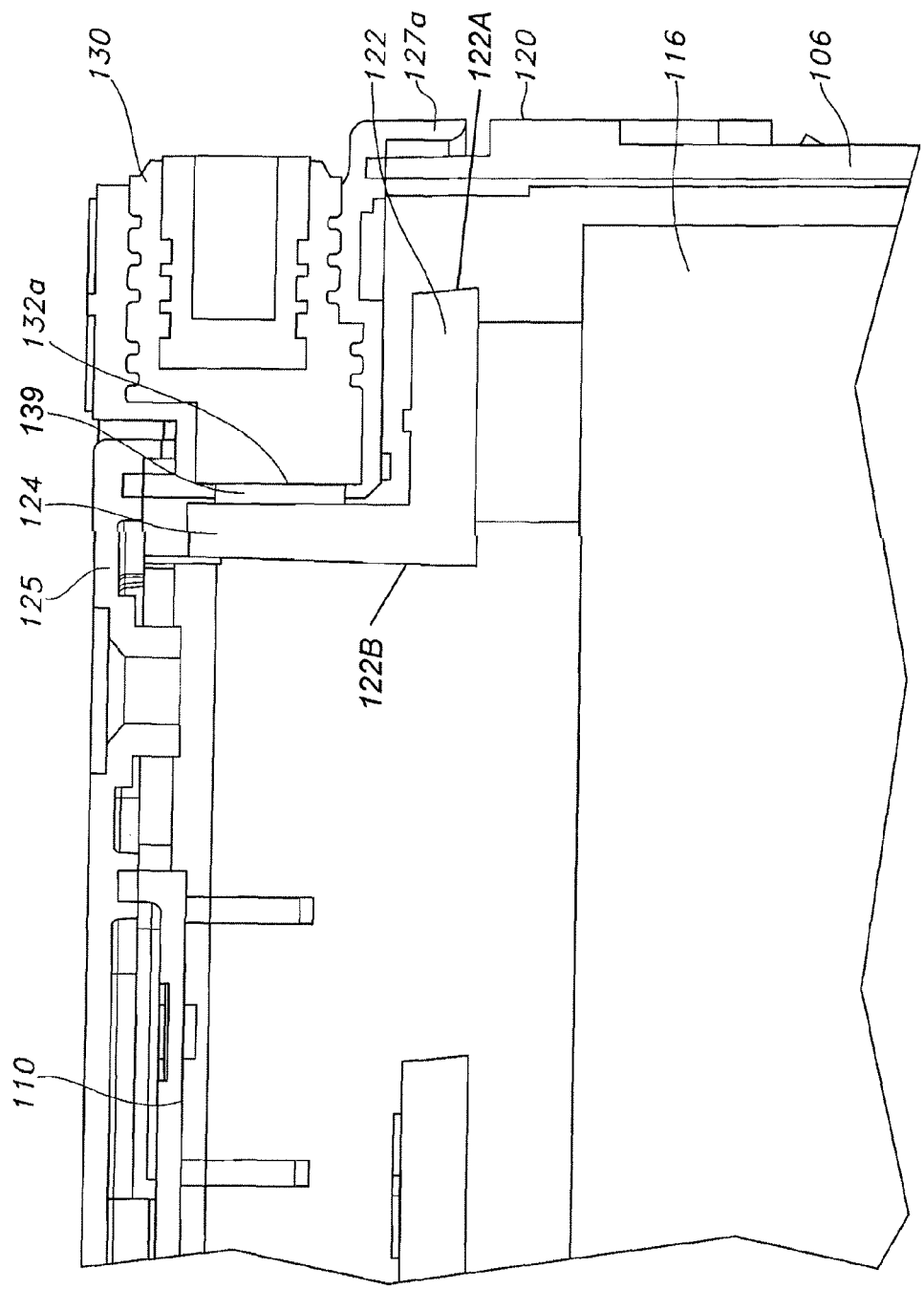
FIG. 4 is a side plan view, partially in section, of the battery of FIG. 3.
Figure 5:
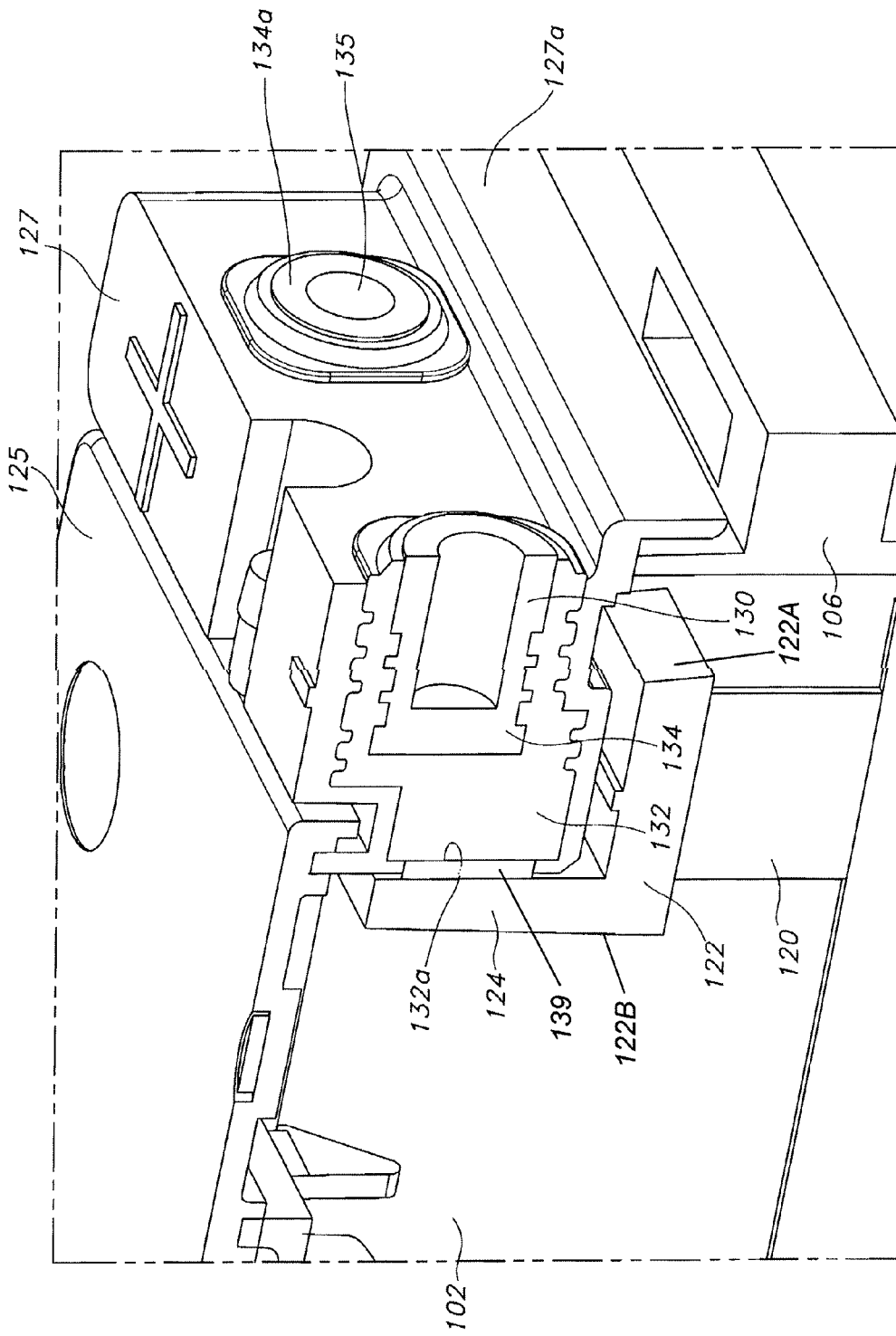
FIG. 5 is a perspective showing, partially in section of the battery of FIG. 3.

As shown in further detail in FIGS. 4 and 5, the respective lugs 120, adjacent the battery terminal 130, are interconnected by a conductive terminal strap 122. The strap 122 is an electrically conductive element which is welded or otherwise electrically connected to the lugs 120 in conventional fashion. Each conductive strap 122 has an outboard edge 122a facing toward the front wall 106, and an inboard edge 122b facing away from the front wall 106. Extending upwardly from the inboard edge 122b and preferably integrally formed with each strap is a conductive terminal tombstone 124. Each tombstone 124 has a generally planar transversely directed face. The tombstone 124 and the strap 122 form a generally L-shaped configuration with the tombstone 124 being spaced a distance from front wall 106 of container 110. Preferably, the strap 122 extends forwardly from the tombstone 124, towards the front wall 106 so that the terminal 130 is positioned within the L-shaped configuration. Each terminal extends along a central axis transversely away from the transversely directed face of the respective tombstone. The construction of the tombstone and strap allow battery terminals 130, which connect to the battery cells, to be supported within the general outline or footprint of the battery container. As will be described in further detail hereinbelow, each terminal 130 is positioned inboard of the plane of the container end walls, thus within the container footprint, rather than extending outwardly therefrom as shown in FIG. 1.

The battery terminals 130 of the present invention are molded-in battery terminals which are molded into the primary cover 127 of the battery. The primary cover 127 spans a location between the front wall 106 of the container and the secondary cover 125 overlying the open end thereof. A skirt-like lip 127a overlies and surrounds an upper portion of container 102.

Each terminal 130 includes a lead bushing 132 which supports therein the brass insert 134. The brass insert 134 has a central aperture 135, which is preferably internally screw threaded for conventional termination of a battery cable (not shown) or other connection hardware. The terminal is of the type more fully shown and described in commonly assigned co-pending U.S. patent application Ser. No. 12/156,571, filed Jun. 3, 2008, which is incorporated by reference herein for all purposes. The bushing 132 includes a generally planar termination end. The bushing 132 also includes an outer surface that is noncircular in cross-section, the cross-section being taken generally perpendicular to the central axis adjacent the container wall, as shown in FIG. 5.

The back end 132a of the bushing 132 is welded to the upstanding tombstone 124 at weldment 139 establishing electrical connection therebetween. The arrangement and construction of the tombstone with respect to the battery terminal 130 allows the battery terminal 130 and the tombstone 124 to be directly connected thus providing a shorter current path then is achievable with the construction shown in FIG. 2. As particularly shown in FIGS. 4 and 5, the weldment 139 is directly adjacent the back end 132a of bushing 132 and directly connects to the up standing tombstone 124. Weldment access is provided from above where the weld connection between the tombstone and the battery terminal is created prior to placement of secondary cover 125 over the battery container. This shorter current path provides better direct connection between the tombstone and the battery terminal than is provided with the battery construction of the prior art. The forward end 134a of insert 134 is positioned adjacent the forward wall 106 of container 102. This arrangement presents the termination location, namely the end of aperture 135, at a position which does not extend beyond the front wall of the container. The terminals are supported within the primary cover and contained within the container footprint. Thus, the terminal 130 does not extend outwardly of the container end walls and, therefore, allows the storage battery to be positioned in a smaller footprint while still allowing access to the aperture 135 for connection purposes. The terminals do not extend above the primary or secondary covers.

Figure 6:
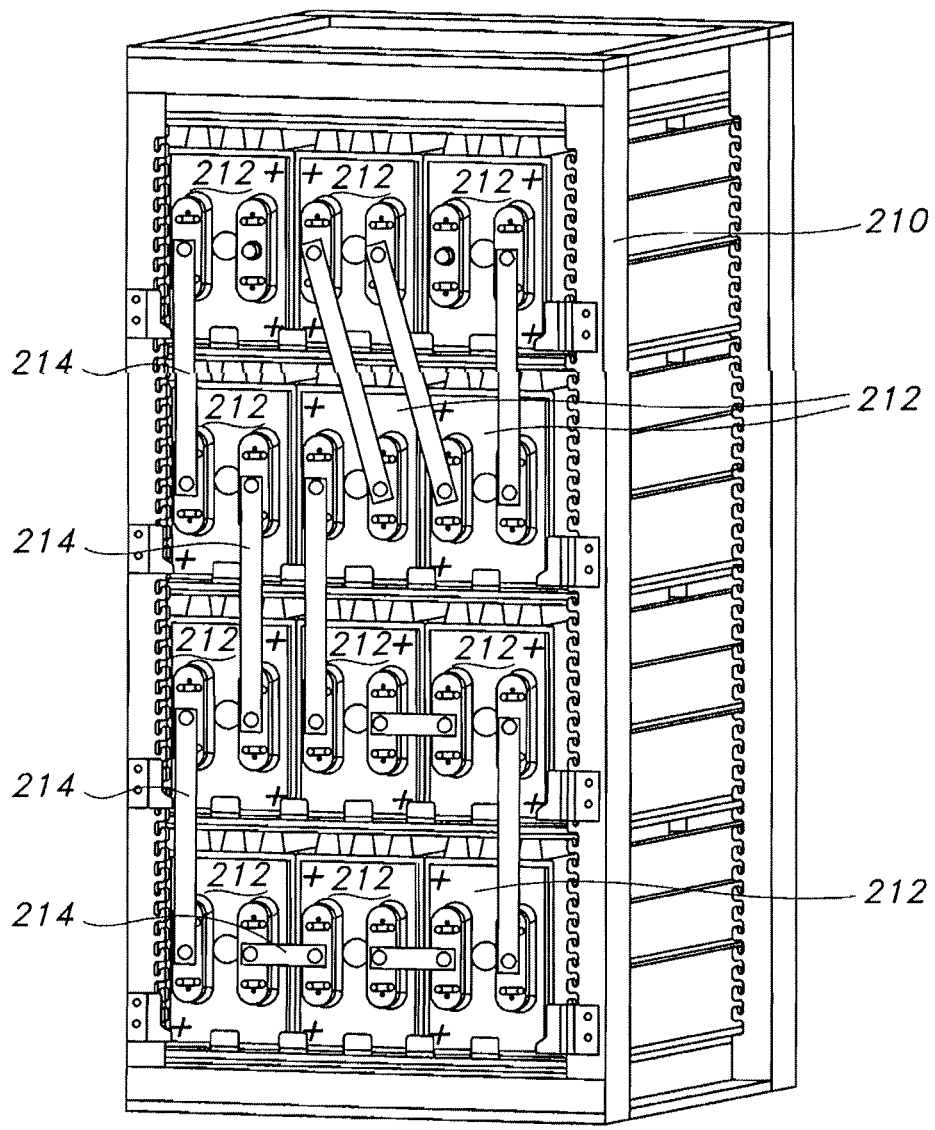
FIG. 6 shows an arrangement of connected storage batteries in a rack.

Storage batteries of the type shown herein may be arranged in a rack or cabinet system so that multiple batteries may be interconnected. One such arrangement of multiple storage batteries in a rack 210 is shown in FIG. 6. This arrangement is of the type shown in commonly assigned U.S. Pat. No. 6,794,081 which is incorporated by reference herein for all purposes. Each of the batteries 212 shown in the rack 210 are interconnected by a termination device, specifically a bus bar 214. The bus bar 214 is used to connect the respective positive and negative terminals of the batteries. Thereafter, cables (not shown) may be used to connect the racked array of storage batteries 212 to the desired device. As can be seen in the arrangement in FIG. 6, the batteries 212 must be positioned with the terminals facing outwardly so that the bus bars 214 can be connected to the extending terminals. In certain rack arrangements, the batteries are positioned so that the spaces between batteries is ½" or less. In these situations, it would be difficult, if not impossible, to use a replacement battery with an extending terminal. The present invention, by providing termination at the front wall of the battery, allows termination of the battery with the bus bar to occur within the original footprint.

In addition, the present invention, by providing the specific arrangement of the connection components, i.e., the terminal strap and terminal tombstone connected to the battery terminal 130 supported in primary cover 127, allows direct disconnectable connection of the termination device to the terminal at a location at the front wall 106 of the container.

Figure 7:
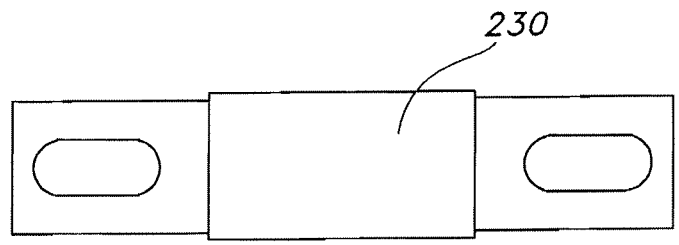
FIG. 7 shows a bus bar for connecting batteries arranged in a rack such as shown in FIG. 6.

FIG. 7 shows a copper bus bar 230 which may be used in accordance with the present invention. This bus bar can be connected and disconnected at the front wall without having to provide a significant amount of space outboard of the battery to effect disconnectable connection.

Various changes to the foregoing described and shown structures would now be evident to those skilled in the art. Accordingly, the particularly disclosed scope of the invention is set forth in the following claims.

What is claimed:

1. A storage battery comprising:
    a generally rectangular container having opposed side walls, end walls including a front wall, a bottom wall and an open upper end defining a container interior and a container footprint;
    said container interior being divided into a plurality of cells supporting positive and negative plates, said plates including aligned positive lugs and aligned negative lugs;
    a cover structure for enclosing said open upper end of said container;
    a pair of conductive straps, one said strap interconnecting said positive lugs and another said strap interconnecting said negative lugs, the pair of conductive straps each having an outboard edge facing toward the front wall and an inboard edge facing away from the front wall;
    a tombstone extending upwardly from the inboard edge of each strap, each said tombstone having a generally planar transversely directed face, each said tombstone being integrally formed with each strap, each said tombstone being located at a position spaced inwardly from said container walls with said strap extending toward the front wall therefrom with said tombstone and said extending strap being within said container footprint; and
    a pair of battery terminals supported within said cover and contained within said container footprint, each said terminal extending along a central axis transversely away from the transversely directed face of a respective one of said tombstones, each said terminal including a bushing and an insert, the bushing having an outer surface non-circular in cross-section, the cross-section being taken generally perpendicular to said central axis adjacent said container wall, said insert including a connection end and said bushing including a generally planar termination end, the bushing of each said battery terminal including a weldment directly connecting the planar termination end to the planar transversely directed face of the respective one of said tombstones, each said battery terminal being positioned between said tombstone and said container wall and said insert including an opening adjacent said container wall for direct disconnectable termination at said container wall.

2. The storage battery of claim 1 wherein said terminating opening is internally screw threaded.

3. The storage battery of claim 1 wherein said cover structure includes a primary cover and a secondary cover.

4. The storage battery of claim 3 wherein said secondary cover extends along said open upper end of said container and said primary cover extends along said open upper end of said container and including a depending skirt extending about said container.

5. The storage battery of claim 4 wherein said battery terminals are formed within said primary cover.

6. The storage battery of claim 5 wherein:
    said battery terminals are formed within an extent of said primary cover extending along one of said end walls; and
    said battery terminals are molded into said primary cover.

7. The storage battery of claim 1 wherein said termination device includes a bus bar.

8. The storage battery of claim 1 wherein said strap and said tombstone form an L-shaped configuration.

9. The storage battery of claim 8 wherein said terminals are accommodated within said L-shaped configuration.

10. The storage battery of claim 1 wherein said strap extends from said tombstone towards an adjacent end wall.

11. A storage battery comprising:
    a generally rectangular container having opposed side walls, end walls including a front wall, a bottom wall and an open upper end defining a container interior and a container footprint;
    said container interior being divided into a plurality of cells supporting positive and negative plates, said plates including aligned positive lugs and aligned negative lugs;
    a pair of conductive straps, one said strap interconnecting said positive lugs and another said strap interconnecting said negative lugs, the pair of conductive straps each having an outboard edge facing toward the front wall and an inboard edge facing away from the front wall;
    a tombstone extending upwardly from the inboard edge of each strap, each said tombstone having a generally planar transversely directed face, each said tombstone being integrally formed with each strap, each said tombstone being located at a position spaced within said container footprint;
    a primary cover supported over said container open upper end, said primary cover including an access port adjacent each said tombstone;
    a pair of battery terminals supported within said primary cover within said container footprint, each said terminal extending transversely away from the transversely directed face of a respective one of said tombstones, including a connection end and a generally planar termination end;

a weldment directly between said planar termination end of each said battery terminal and the planar transversely directed face of the respective one of said tombstones, said weldment being applied through said access port of said primary cover; and a secondary cover structure for enclosing said open upper end of said container.

\* \* \* \* \*